(12) United States Patent
Taylor et al.

(10) Patent No.: US 6,865,683 B2
(45) Date of Patent: Mar. 8, 2005

(54) SYSTEM AND METHOD FOR POWERING DOWN A MOBILE DEVICE

(75) Inventors: Matthew W. Taylor, North Bend, WA (US); Neil R. N. Enns, Redmond, WA (US); Andrew D. Padawer, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 102 days.

(21) Appl. No.: 09/862,387

(22) Filed: May 21, 2001

(65) Prior Publication Data

US 2002/0174371 A1 Nov. 21, 2002

(51) Int. Cl.[7] ............................................... G06F 1/26
(52) U.S. Cl. ....................................................... 713/310
(58) Field of Search ........................ 713/310, 320–324; 455/343, 574

(56) References Cited

U.S. PATENT DOCUMENTS

| | | | | |
|---|---|---|---|---|
| 4,162,610 A | * | 7/1979 | Levine | 368/41 |
| 4,860,005 A | * | 8/1989 | DeLuca et al. | 340/7.38 |
| 5,542,035 A | * | 7/1996 | Kikinis et al. | 713/323 |
| 5,560,021 A | * | 9/1996 | Vook et al. | 713/323 |
| 5,603,038 A | * | 2/1997 | Crump et al. | 713/310 |
| 5,625,882 A | * | 4/1997 | Vook et al. | 455/38.3 |
| 5,640,176 A | * | 6/1997 | Mundt et al. | 345/146 |
| 5,737,616 A | * | 4/1998 | Watanabe | 713/340 |
| 5,758,137 A | * | 5/1998 | Armstrong, Jr. et al. | 713/502 |
| 5,832,283 A | * | 11/1998 | Chou et al. | 713/300 |
| 6,065,123 A | * | 5/2000 | Chou et al. | 713/322 |
| 6,189,106 B1 | * | 2/2001 | Anderson | 713/300 |
| 6,208,996 B1 | * | 3/2001 | Ben-Shachar et al. | 707/104.1 |
| 6,209,011 B1 | * | 3/2001 | Vong et al. | 708/112 |
| 6,289,464 B1 | * | 9/2001 | Wecker et al. | 713/300 |
| 6,317,593 B1 | * | 11/2001 | Vossler | 455/414 |

OTHER PUBLICATIONS

Condon et al., "Rednet: A Wireless ATM Local Area Network using Infrared Links," *MOBICOM* 95, 1995, pp. 151–159.

Liu et al., "A Mobile Virtual–distributed System Architecture for Supporting Wireless Mobile Computing and Communications," *MOBICOM* 95, 1995, pp. 111–118.

Liu et al., "A mobile virtual–distributed system architecture for supporting wireless mobile computing and communications," *Wireless Networks* 2, 1996, pp. 77–86.

Kravets et al., "Power Management Techniques for Mobile Communication," *MOBICOM* 98, 1998, pp. 157–168.

* cited by examiner

Primary Examiner—P. Austin Bradley
Assistant Examiner—X. Chung-Trans
(74) Attorney, Agent, or Firm—Merchant & Gould; Ryan T. Grace

(57) ABSTRACT

Described is a mechanism for mobile devices that allows a user to set a time at which the mobile device will automatically power down, and another time at which the mobile device will wake up. The mechanism further allows the mobile device to be awakened earlier than the wake up time if an event is scheduled to occur prior to the wake up time. Furthermore, the mechanism provides for the cancellation of the automatic power down or wake up, based on user input.

22 Claims, 5 Drawing Sheets

SYSTEM AND METHOD FOR POWERING DOWN A MOBILE DEVICE

FIELD OF THE INVENTION

The present invention relates generally to computer-executable software, and more particularly to increasing power management efficiency in mobile devices.

BACKGROUND OF THE INVENTION

Consumer electronics of almost any size now include controllers or processors and perform many functions that used to be exclusively within the domain of the desktop computer. One such device, the cellular phone, previously dedicated to transmitting only voice communication, is now being used for a variety of functions, such as Personal Information Management (PIM) and Personal Digital Assistant (PDA) functions. In addition, consumers are pushing the market to make the devices smaller and smaller. As the devices become smaller yet more powerful, power consumption becomes an ever increasing problem. The limitations of power storage components, both in size and capacity, make it difficult to operate mobile devices for extended periods of time. Mobile device designers are constantly seeking ways and mechanisms to extend the time between recharging the mobile devices.

SUMMARY OF THE INVENTION

The present invention provides a system and method for extending the time interval between recharging a mobile device. The invention provides a personal data assistant (PDA) application for mobile devices that allow a user to set a time at which the mobile device will automatically power down, and another time at which the mobile device will wake up. The result extends battery life.

In one aspect of the invention, an application is in communication with an operating system, a timer, a switch, an appointment register, and a file system. The application allows the user to set a time period during which limited or no activity is expected. When the given time is reached, the application puts the mobile device into a sleep mode until the end of the user defined time period, or until a scheduled event, whichever occurs first. In this way, the existing power management system may be supplemented with these power savings thereby extending the length of time between recharging, and ultimately extending the battery life as well. The invention further includes a switch to shut down the system. If the switch is used to shut down the system, the auto wake up feature is circumvented. This allows added flexibility such as, for example, the ability to negate the awakening process if traveling necessitates it.

DETAILED DESCRIPTION OF THE PREFERRED EMBODIMENT

The present invention provides a system and method for facilitating the reduction of power usage during specified time periods, within an electronic mobile device. The invention further provides a user configurable implementation that offers flexible and adaptable options to a user's potential power needs. Among other things, disclosed is a system that lengthens the battery charge interval of a mobile device. This system is beneficial in a reduced battery capacity environment.

Illustrative Operating Environment

Figure 1:
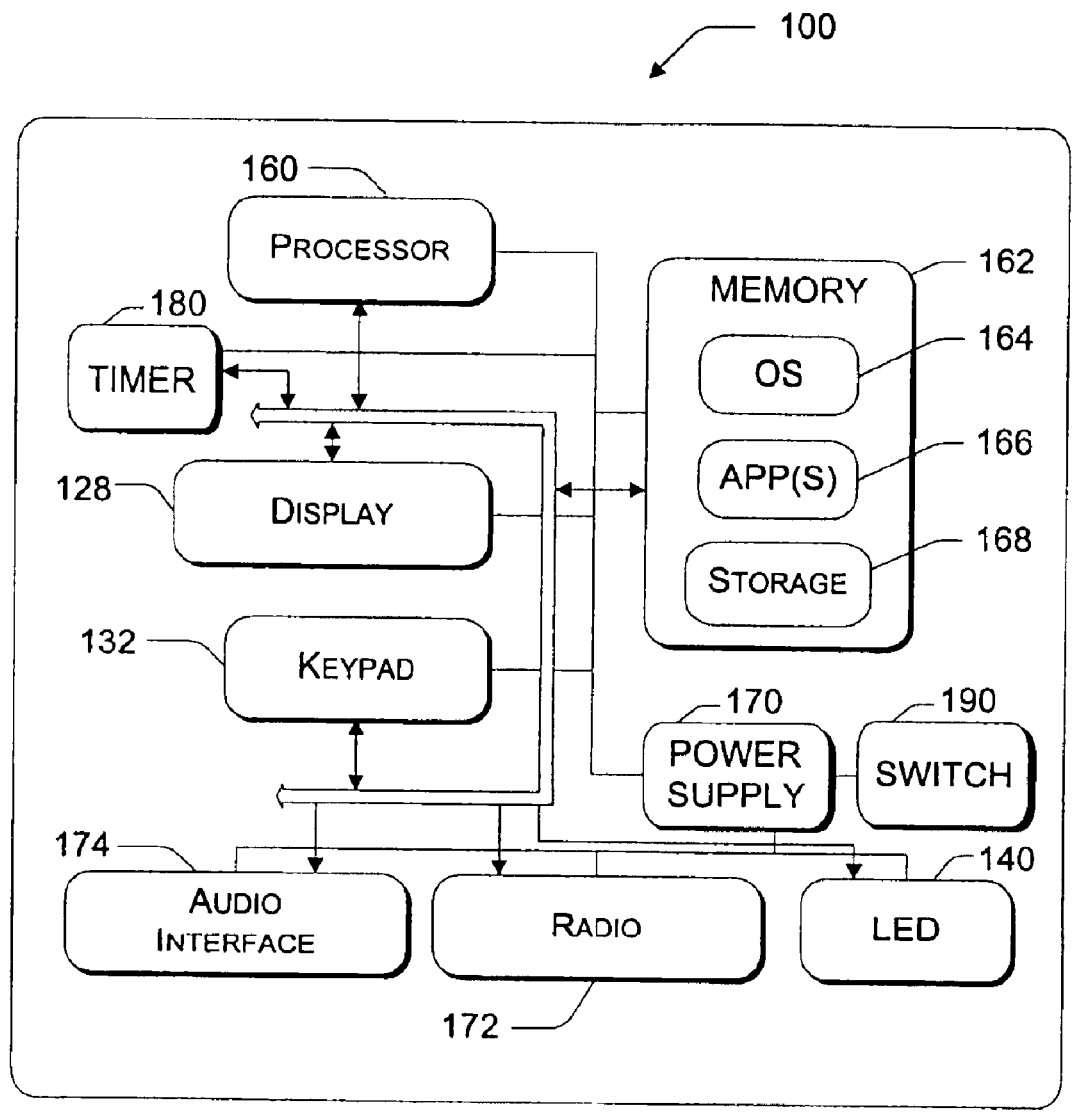
FIG. 1 is a functional block diagram illustrating functional components of a mobile computing device that may be adapted to implement one embodiment of the present invention.

FIG. 1 is a functional block diagram illustrating functional components of a mobile computing device 100. The mobile computing device 100 has a processor 160, a memory 162, a display 128, a keypad 132, a hard switch 190, and a timer 180. The memory 162 generally includes both volatile memory (e.g., RAM) and non-volatile memory (e.g., ROM, Flash Memory, or the like). The mobile computing device 100 includes an operating system 164, such as the Windows CE operating system from Microsoft Corporation or other operating system, which is resident in the memory 162 and executes on the processor 160. The timer 180 may be a low power detector matched to a low frequency crystal. The keypad 132 may be a push button numeric dialing pad (such as on a typical telephone), a multi-key keyboard (such as a conventional keyboard), or other such input device, which would function in the required fashion. Similarly, the hard switch 190 may be a push button pad, or other such input device which may be implemented as a key on the keypad 132, a separate key, or the like. The display 128 may be a liquid crystal display, or any other type of display commonly used in mobile computing devices. The display 128 may be touch sensitive, and would then also act as an input device.

One or more application programs 166 are loaded into memory 162 and run on the operating system 164. Examples of application programs include phone dialer programs, email programs, scheduling programs, PIM (personal information management) programs, word processing programs, spreadsheet programs, Internet browser programs, and so forth. In this embodiment, the applications 166 include a power management application, described later. The mobile computing device 100 also includes non-volatile storage component 168 within the memory 162. The non-volatile storage component 168 may be used to store persistent information which should not be lost if the mobile computing device 100 is powered down. The applications 166 may use and store information in the storage component 168, such as e-mail or other messages used by an e-mail application, contact information used by a PIM, appointment information used by a scheduling program, documents used by a word processing application, and the like. A synchronization application also resides on the mobile device and is programmed to interact with a corresponding synchronization application resident on a host computer to keep the information stored in the storage component 168 synchronized with corresponding information stored at the host computer.

The mobile computing device 100 has a power supply 170, which may be implemented as one or more batteries. The power supply 170 might further include an external power source, such as an AC adapter or a powered docking cradle that supplements or recharges the batteries. The hard switch 190 is connected to the power supply 170.

The mobile computing device 100 is also shown with two types of external notification mechanisms: an LED 140 and an audio interface 174. These devices may be directly coupled to the power supply 170 so that when activated, they remain on for a duration dictated by the notification mechanism even though the processor 160 and other components might shut down to conserve battery power. The LED 140 may be programmed to remain on indefinitely until the user takes action to indicate the powered-on status of the device. The audio interface 174 is used to provide audible signals to and receive audible signals from the user. For example, the audio interface 174 may be coupled to a speaker for providing audible output and to a microphone for receiving audible input, such as to facilitate a telephone conversation.

The mobile computing device 100 also includes a radio 172 that performs the function of transmitting and receiving radio frequency communications. The radio 172 facilitates wireless connectivity between the mobile computing device 100 and the outside world, via a communications carrier or service provider. Transmissions to and from the radio 172 are conducted under control of the operating system 164. In other words, communications received by the radio 172 may be disseminated to application programs 166 via the operating system 164, and vice versa.

Illustrative Power Conservation System

Figure 2:
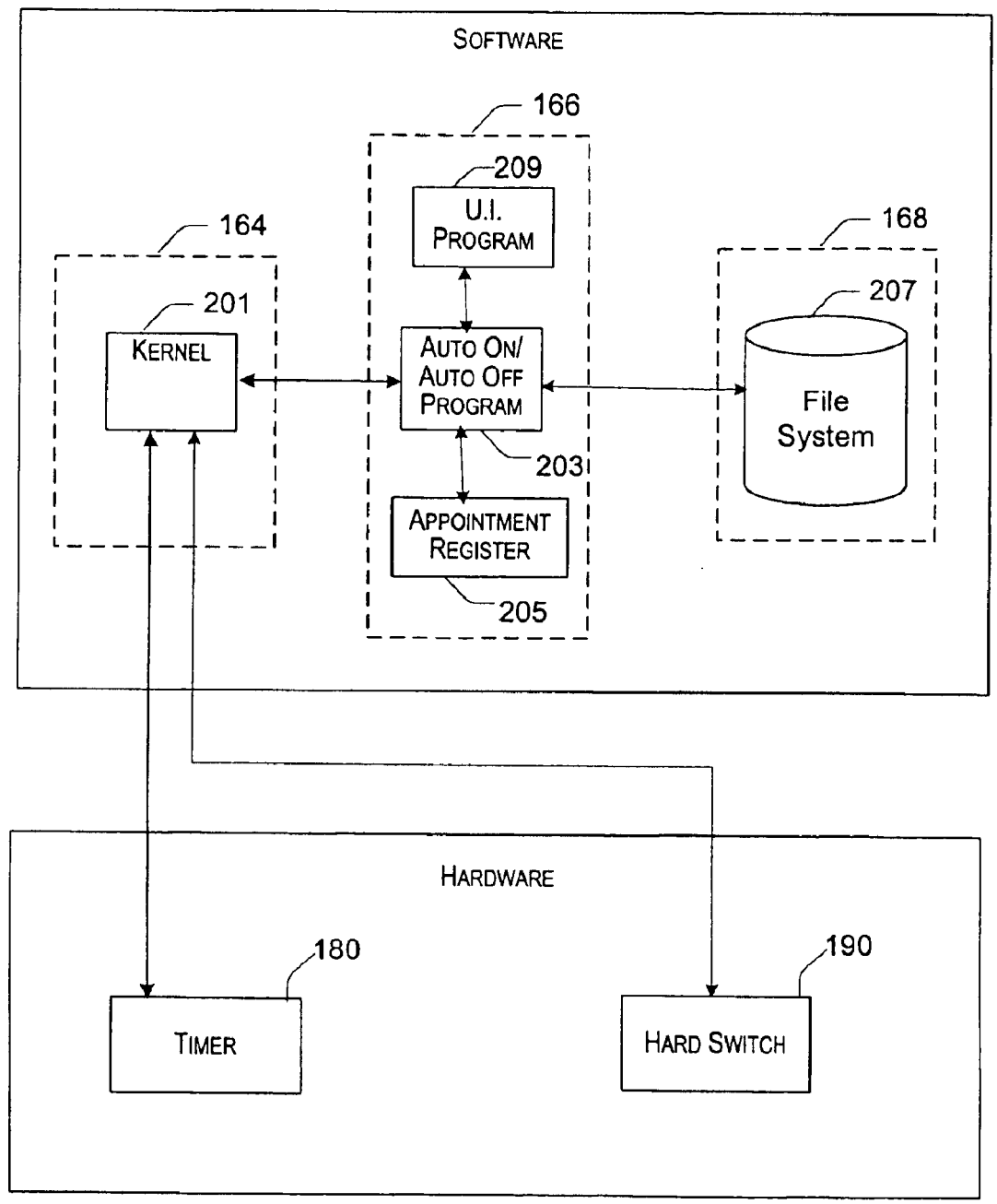
FIG. 2 is a functional block diagram illustrating a subsystem of the system illustrated in FIG. 1, including a timer, a switch, and memory, and focusing on the relationship of these three components, in accordance with one embodiment of the present invention.

FIG. 2 is a functional block diagram illustrating a subsystem 200 of the system illustrated in FIG. 1, including the timer 180, the hard switch 190, and the memory 162, and focusing on the relationship of these three components. System 200 is further adapted to organize and implement power conservation within a mobile device, according to one embodiment of the invention.

As mentioned above, memory 162 includes operating system 164, applications 166, and storage component 168. These components are further detailed below. Operating system 164 further includes a kernel 201, among numerous other software devices. The kernel 201 is a software component that determines how the operating system 164 uses the processor and ensures it is used efficiently. The kernel provides fundamental I/O support to the applications 166, such as passing keypad input and the like to the applications 166.

Applications 166 include an Auto On/Auto Off program 203, appointment register 205, and a user interface program ("U.I. program") 209. Auto On/Auto Off program 203 is the primary program for this power conservation system. Further, Auto On/Auto Off program 203 is in communication with other software elements of applications 166 and the principal controller of the other software components utilized by Auto On/Auto Off program 203 and residing within application 166. Appointment register 205 is a registration database containing appointment information, registered in the system 200. The appointment register 205 includes entries that associate particular appointment times that may be set by an appointment management application (not shown) or other such PIM-related mechanism.

U.I. program 209 is a software component that provides input and output communication between the Auto On/Auto Off program 203 and the user. U.I. program 209 allows the user to interact with the Auto On/Auto Off program 203, for example, to provide the desired times that mobile device should sleep and awaken. Additionally, U.I. program 209 allows the user to cancel certain actions which may be scheduled to occur. For example, before the system sleeps or awakens, the U.I. program 209 may display a count down to sleep mode or awaken mode, and allow user input. U.I. program 209 may prompt the user to stop the Auto On/Auto Off program 203 while the count down is proceeding by allowing the user to input her desire to do so.

Storage component 168 includes among numerous other things, a file system 207 which acts as a storage area for data in the system. The file system 207 may contain pertinent information, such as that used by the appointment register 205, relating to events or aspects of the system. For example, the amount of time allotted for countdown prior to sleep mode, etc., may be stored in an area of the file system 207.

Figure 3:
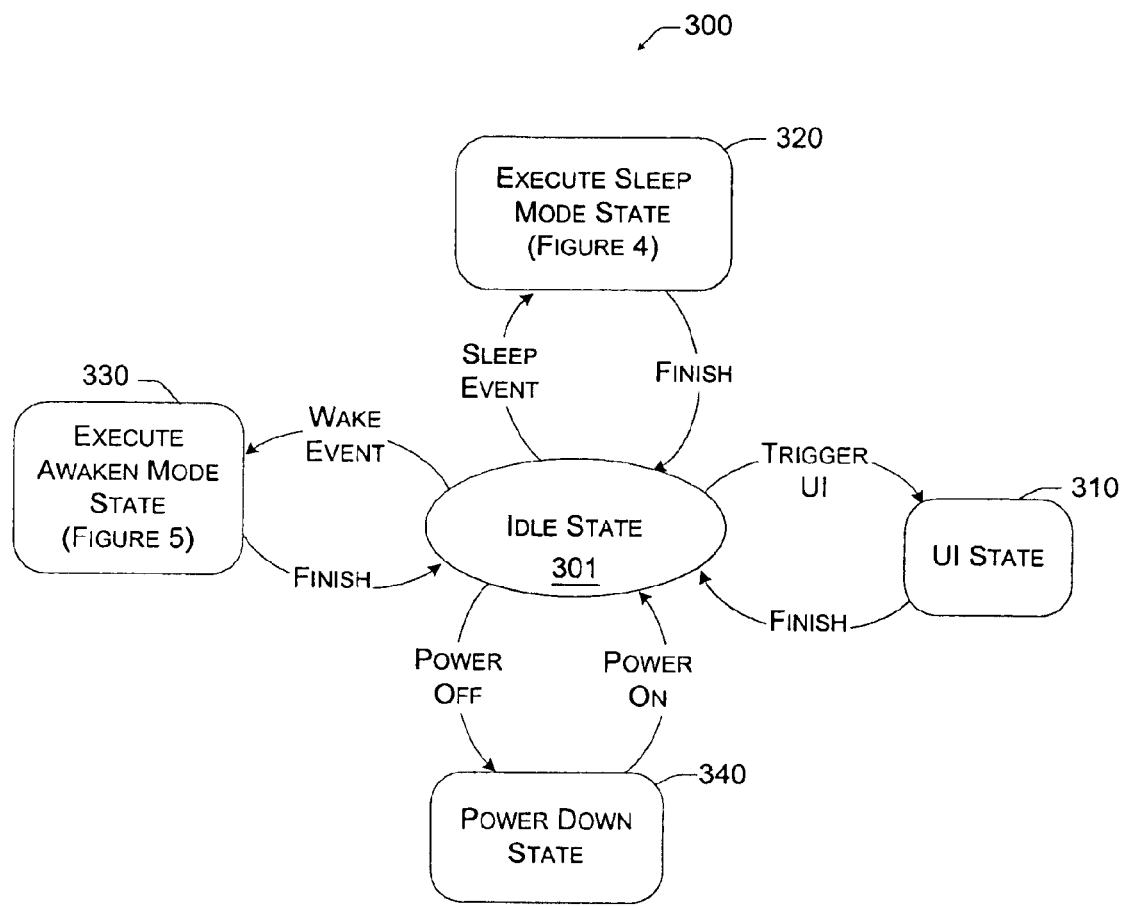
FIG. 3 is a state diagram illustrating the movement of processes between states based on predetermined criteria.

FIG. 3 is a state diagram that generally illustrates several distinct states a system 300 can enter based upon events occurring within the system 300. System 300 includes an idle state 301, a U.I. state 310, an execute sleep mode state 320, an execute awaken mode state 330, and a power down state 340. Idle state 301 describes a state where the system 300 is idle and is awaiting either input from the user or some other event to occur. When the system 300 receives input, or some other event occurs, the system 300 moves from the idle state 301 to the state necessitated by the event.

U.I. state 310 describes a state wherein the system 300 is in communication with the user. System 300 moves from the idle state 301 to the U.I. state 310 if the system 300 receives a specified event that triggers the U.I., such as keypad input, voice-activated input, or the like. While in U.I. state 310, the system 300 may communicate with the user to request, display, or receive information necessary to either inform the user of the current process parameters, or to receive instruction from the user with regard to process parameters. For example, the U.I. state 310 may invoke the U.I. program 209, thereby allowing the user to review and set parameters related to the Auto On/Off program 203. When processing in the U.I. state 310 is complete, the system 300 moves from the U.I. state 310 back to the idle state 301.

Execute sleep mode state 320 is illustrated in detail in FIG. 4, and described below. Briefly described, system 300 moves from the idle state 301 to the execute sleep mode state 320 when a sleep event occurs, such as when a specified time is reached or when a specified timer has elapsed. Execute sleep mode state 320 is a state wherein the system 300 is attempting to command the mobile device to enter into a low power mode. When processing in the execute sleep mode state 320 is complete, the system 300 returns to the idle state 301.

Execute awaken mode state 330 is illustrated in detail in FIG. 5, and described below. Briefly described, system 300 moves from the idle state 301 to execute awaken mode state 330 when a wake event occurs, such as when a specified timer has elapsed or when a specified time is reached. Execute awaken mode state 330 describes a state wherein the system 300 is attempting to command the mobile device to boot and move from the low power mode to an active mode. When processing in the execute awaken mode state 330 is complete, the system 300 returns to the idle state 301.

Power down state 340 describes a state wherein the system 300 and the mobile device are powered down. System 300 moves from the idle state 301 to the power down state 340 when a power off event occurs, such as, for example, when the user presses the hard switch 190 (FIG. 1). While in the power down state 340 the system 300 conducts the appropriate processes required to shut down the mobile device entirely, that is, to turn the device off. For example, if the device had completed the execute sleep mode state 320, and thus the device was sleeping, entering the power down state 340 would result in the device being completely shut down and therefore not awakened when the designated time to awaken was reached.

Figure 4:
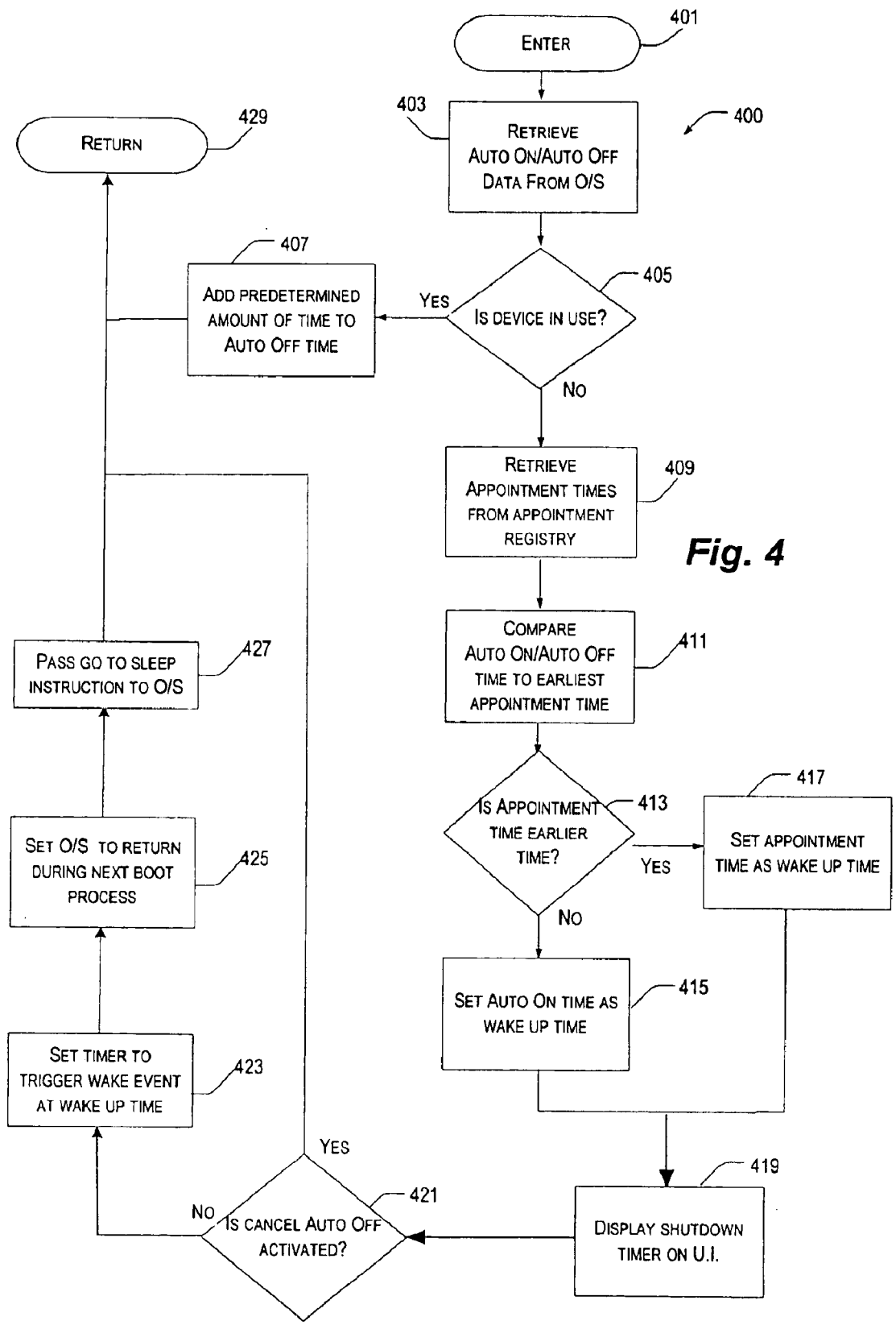
FIG. 4 is a logical flow diagram illustrating a process for determining a wake up time and implementing a sleep time, in accordance with one embodiment of the present invention.

FIG. 4 is a logical flow diagram generally illustrating a process performed in the sleep mode state 320. In describing FIG. 4, reference is made to the system 200 described in conjunction with FIGS. 2 and 3. Process 400 enters at starting block 401, where a sleep event has triggered the system 200 to move from the idle state 301 to the execute sleep mode state 320, such as when a predetermined time (an "Auto Off time") has been reached or a specified timer has elapsed. The process advances to block 403 where process 400 retrieves Auto On/Auto Off data from the file system 207 via the operating system 164. Data retrieved may include the specified times for the device to sleep (Auto Off time) and awaken (Auto On time), or the like.

At block 405, process 400 determines if the mobile device is in use. If the device is in use the process advances to block 407 where a predetermined amount of time is added to the Auto Off time. The resultant value is returned as a new Auto Off time to the file system 207. The process then advances to block 429 and returns from the execute sleep mode state 320 to the idle state 301. If the device is not in use at block 405, the process 400 advances to block 409.

At block 409 appointment times are retrieved from the appointment registry 205. Appointment times represent scheduled events, such as meetings and the like, the PDA portion of the mobile device is responsible for organizing and presenting to the user. Appointment times may include scheduled times the user has provided, scheduled times others have requested and the user has accepted, and the like. At block 411 the process 400 compares the Auto On time to the appointment times to determine the soonest occurring time.

At block 413 the process 400 determines if the Auto On time is the closest of the times compared. If the Auto On time is the closest, then the process 400 advances to block 415 where the Auto On time is established as the Wake Up time. The Wake Up time is that time designated by the process 400 as the time at which the system 200 will trigger a wake event. If any of the appointment times are determined to be sooner than the Auto On time, then the process 400 advances to block 417.

At block 417 the soonest appointment time is assigned as the Wake Up time. The process 400 then advances to block 419. At block 419 the process 400 displays a shutdown ("countdown") timer on the user interface. The process 400 may implement this display utilizing the Auto On/Auto Off program 203 in conjunction with the U.I. program 209. For example, the user interface may display a predetermined numerical countdown prior to the mobile device going into the low power mode. The process 400 then advances to block 421.

At block 421 the process 400 determines if the user has instructed the Auto On/Auto Off program 203 to cancel. The user is provided with the opportunity to cancel the power down operation to allow maximum flexibility within the program. For example, the keypad or some such other input device may allow an input to the U.I. program 209, prior to the aforementioned countdown ending, to cancel the power down. If the power down is cancelled, then the process 400 advances to block 429 and returns the system 300 from the execute sleep mode state 320 to the idle state 301. If the power down is not cancelled then the process 400 advances to block 423.

At block 423 the process 320 sets the timer 180 to trigger a wake event at the designated Wake Up time. The process 320 may set the timer 180 by utilizing the Auto On/Auto Off program 203 to compare the Wake Up time to the current time and determine a difference time. The difference time is then passed from the Auto On/Auto Off program 203 to the operating system 164 to be placed into the timer 180. The process 320 then advances to block 425.

At block 425 the process 400 instructs the operating system 164 to suspend the next boot process and to call the Auto On/Auto Off program to perform the processing in the awaken mode state 330 prior to completing the boot process. The process 400 may instruct the operating system 164 by utilizing the Auto On/Auto Off program 203 to communicate the desired instructions to the operating system 164. The process then advances to block 427.

At block 427 the process 400 passes a go to sleep instruction to the operating system 164. The go to sleep instruction orders the operating system 164 to place the mobile device into the low power state. The process 400 may pass the go to sleep instruction to the operating system 164 by utilizing the Auto On/Auto Off program 203 to communicate the desired order to the operating system 164. The process 400 then advances to block 429, and returns the system 300 from the execute sleep mode state 320 to the idle state 301.

Figure 5:
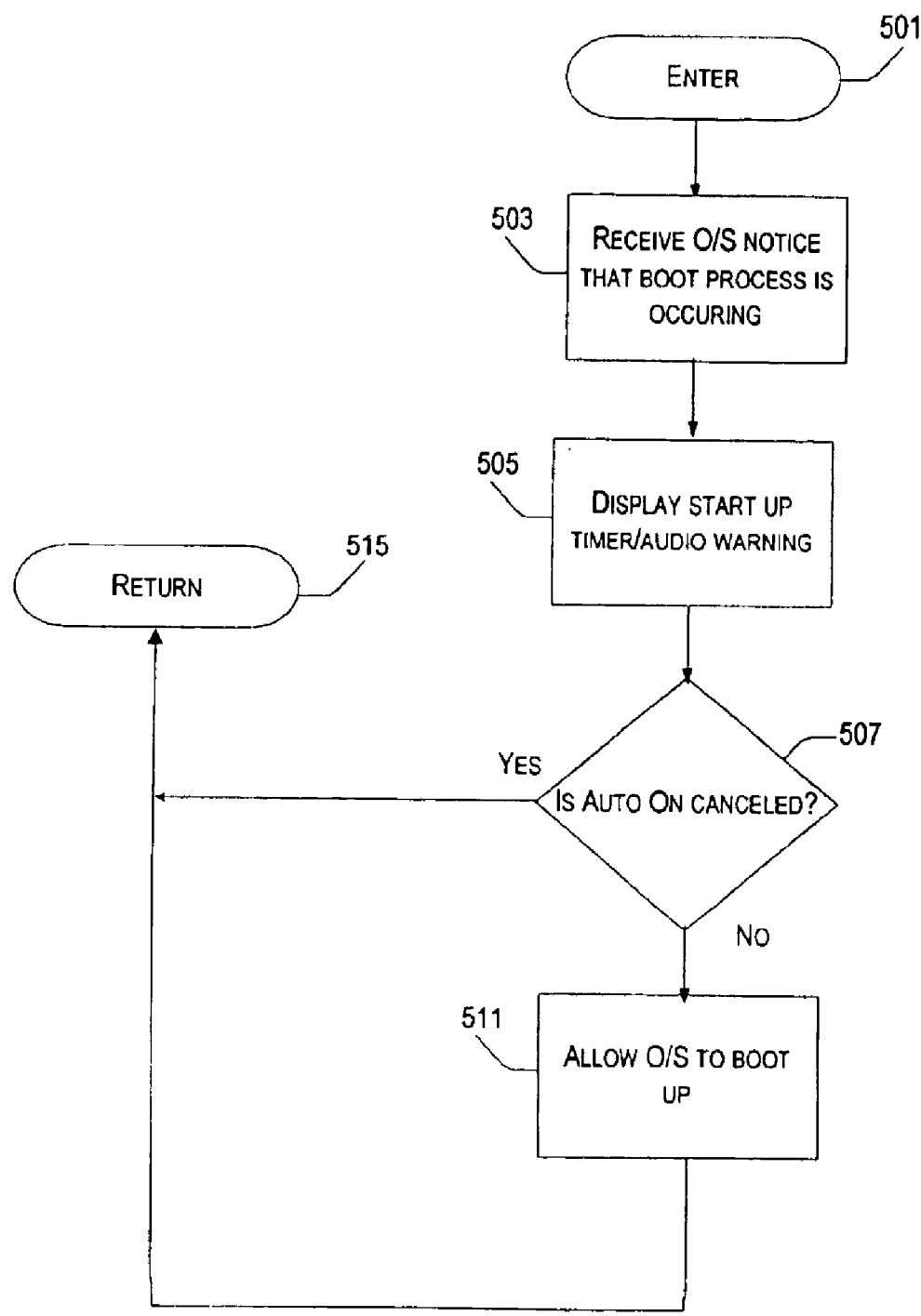
FIG. 5 is a logical flow diagram illustrating a process for implementing a wake up time, in accordance with one embodiment of the present invention.

FIG. 5 is a logical flow diagram generally illustrating a process 500 performed during the awaken mode state 330. In describing FIG. 5, reference is made to the system 200 described in conjunction with FIGS. 2 and 3. Process 500 enters at starting block 501, where an awaken event has triggered the system 300 to move from the idle state 301 to the execute awake mode state 330, such as when a predetermined time (a "Wake Up time") has been reached or a specified timer has elapsed. The process 500 advances to block 503 where the process 500 receives notice, from the operating system 164, that the boot process is occurring and has been suspended while the system 300 is in the execute awake mode state 330. The process 500 then advances to block 505.

At block 505 the process 500 displays a shutdown ("countdown") timer on the user interface. The process 330 may implement this display utilizing the Auto On/Auto Off program 203 in conjunction with the U.I. program 209. For example, the user interface may display a predetermined numerical countdown prior to the mobile device going from the low power state to a normal power mode. The purpose of this step is to allow the user to cancel the power up, such as if the user is on an airplane (where the use of cellular phones is prohibited). The process 500 then advances to block 507.

At block 507 the process 500 determines if the user has instructed the Auto On/Auto Off program 203 to cancel the power down and remain in a low power state. For example, the keypad or some such other input device may allow an input, prior to the aforementioned countdown ending, to cancel the Auto On/Auto Off program 203. If the power up is cancelled then the process 500 advances to block 515 and returns the system 300 from the execute awake mode state 330 to the idle state 301. The process 500 also issues an instruction to the operating system to power off, thereby canceling the boot and leaving the mobile device in the low power mode. If the Auto On/Auto Off program 203 is not cancelled then the process 330 advances to block 511.

At block 511 the process 500 returns a continue boot process instruction to the operating system 164. The continue boot process instruction causes the operating system 164 to cancel the suspension of the boot process and allow the boot process to proceed. The process 500 may pass the awaken instruction to the operating system 164 by utilizing the Auto On/Auto Off program 203 to communicate the desired order to the operating system 164. The process 500 then advances to block 515. At block 515 the process 500 returns the system 300 from the execute awaken mode state 330 to the idle state 301.

At this point, the boot process continues to its conclusion. The mobile computing device 100 then functions in a normal power mode until the next scheduled sleep event. It should be noted that the user may at any time change any of the parameters of the Auto On/Auto Off program, such as the sleep time or the awaken time, or even discontinue use of the program all together if so desired.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A system for managing power consumption on a mobile device having an operating system, a user interface, and a user-actuated hard switch, the system comprising:
   a timer configured to generate a wake event upon the expiration of a countdown time;
   a first set of data including a sleep time and a wake time;
   a second set of data including future appointment times;
   an appointment register configured to store and retrieve time data including the second set of data; and,
   an application configured to put the mobile device in a low power consumption state substantially near the sleep time, and to bring the mobile device out of the low power consumption state at substantially the earlier of the wake time or one of the future appointment times.

2. The system of claim 1, wherein the application is further configured to not bring the mobile device out of the low power consumption state if the mobile device has been shut off by the user-actuated hard switch.

3. The system of claim 1, further comprising a user interface configured to receive the first set of data and the second set of data.

4. The system of claim 3, wherein the user interface provides a countdown mechanism to allow a user prompt and response to cause an abort signal to be sent to the application prior to putting the mobile device into the low power consumption state.

5. The system of claim 3, wherein the user interface provides a countdown mechanism to allow a user prompt and response to cause an abort signal to be sent to the application prior to bringing the mobile device out of the low power consumption state.

6. The system of claim 1, wherein the other times include times at which a predetermined event occurs.

7. The system of claim 6, wherein the predetermined event includes an appointment time.

8. The system of claim 6, wherein the predetermined event includes a meeting time.

9. The system of claim 6, wherein the predetermined event includes a task expiration time.

10. A computer-readable medium on a mobile computing device having computer-executable instructions for performing steps, comprising:
    receiving from an operating system a notice to place the mobile computing device into a low power consumption state;
    retrieving a first set of event data associated with placing the mobile computing device into the low power consumption state, the first set of event data comprising:
        a user defined sleep time at which to put the mobile computing device into the low power consumption state, and
        a user defined wake time at which to bring the mobile computing device out of the low power consumption state;
    accessing a data store to retrieve a second set of event data, the second set of event data comprising additional user defined times;
    comparing the sleep time to each user defined time to determine an earliest occurring time;
    setting a timer to trigger a wake event at the earliest occurring time; and
    putting the mobile computing device into the low power consumption state.

11. The computer-readable medium of claim 10, further comprising:
    prior to putting the mobile computing device into the low power consumption state, determining if the mobile computing device is in use, and if so, delaying the step of putting the mobile computing device into the low power consumption state.

12. The computer-readable medium of claim 11, wherein delaying the step of putting the mobile computing device into the low power consumption state comprises adding a predetermined amount of time to the sleep time.

13. The computer-readable medium of claim 11, wherein delaying the step of putting the mobile computing device into the low power consumption state comprises aborting the step of putting the mobile computing device into the low power consumption state.

14. The computer-readable medium of claim 10, further comprising:
    prior to the step of putting the mobile computing device into the low power consumption state, setting the operating system to suspend a subsequent boot process until receipt of an acknowledgement.

15. The computer-readable medium of claim 14, wherein the acknowledgement is based on a user prompt presented to a user in conjunction with the subsequent boot process.

16. The computer-readable medium of claim 10, further comprising:
    prior to the step of putting the mobile computing device into the low power consumption state, determining if a user provided command to cease the placement of the device into the low power consumption state has been received, and if so, withholding the step of putting the mobile computing device into the low power consumption state.

17. The computer-readable medium of claim 16, wherein withholding the step of putting the mobile computing device into the low power consumption state comprises aborting the step of putting the mobile computing device into the low power consumption state.

18. A computer-readable medium on a mobile computing device having computer-executable instructions for performing steps, comprising:
    receiving a notice to bring the mobile computing device out of a low power consumption state;
    determining if a user provided command to cease bringing the mobile computing device out of the low power consumption state has been received; and
    if the command has not been received, issuing an instruction to the operating system to bring the mobile computing device out of the low power consumption state.

19. The computer-readable medium of claim 18, wherein if the command has been received, leaving the mobile computing device in the low power consumption state.

20. The computer-readable medium of claim 18, wherein determining if the user provided command has been received comprises prompting a user to cancel bringing the mobile computing device out of the low power consumption state.

21. The computer-readable medium of claim 20, wherein prompting the user to cancel includes providing the user with a predetermined amount of time in which to cancel.

22. A computer-implemented method for managing power consumption on a mobile device, the method comprising:

receiving from an operating system a notice to place the mobile computing device into a low power consumption state;

retrieving a first set of event data associated with placing the mobile computing device into the low power consumption state, the first set of event data comprising:
  a user defined sleep time at which to put the mobile computing device into the low power consumption state, and
  a user defined wake time at which to bring the mobile computing device out of the low power consumption state;

accessing a data store to retrieve a second set of event data, the second set of event data comprising additional user defined times;

comparing the sleep time to each user defined time to determine an earliest occurring time;

setting a timer to trigger a wake event at the earliest occurring time;

putting the mobile computing device into the low power consumption state;

receiving a notice to bring the mobile computing device out of a low power consumption state;

determining if a user provided command to cease bringing the mobile computing device out of the low power consumption state has been received; and if the command has not been received, issuing an instruction to the operating system to bring the mobile computing device out of the low power consumption state.

* * * * *